J. C. WALTER.
ELEVATING AND DUMPING APPARATUS.
APPLICATION FILED JAN. 8, 1912. RENEWED FEB. 6, 1914.
1,120,869.
Patented Dec. 15, 1914.
2 SHEETS—SHEET 2.
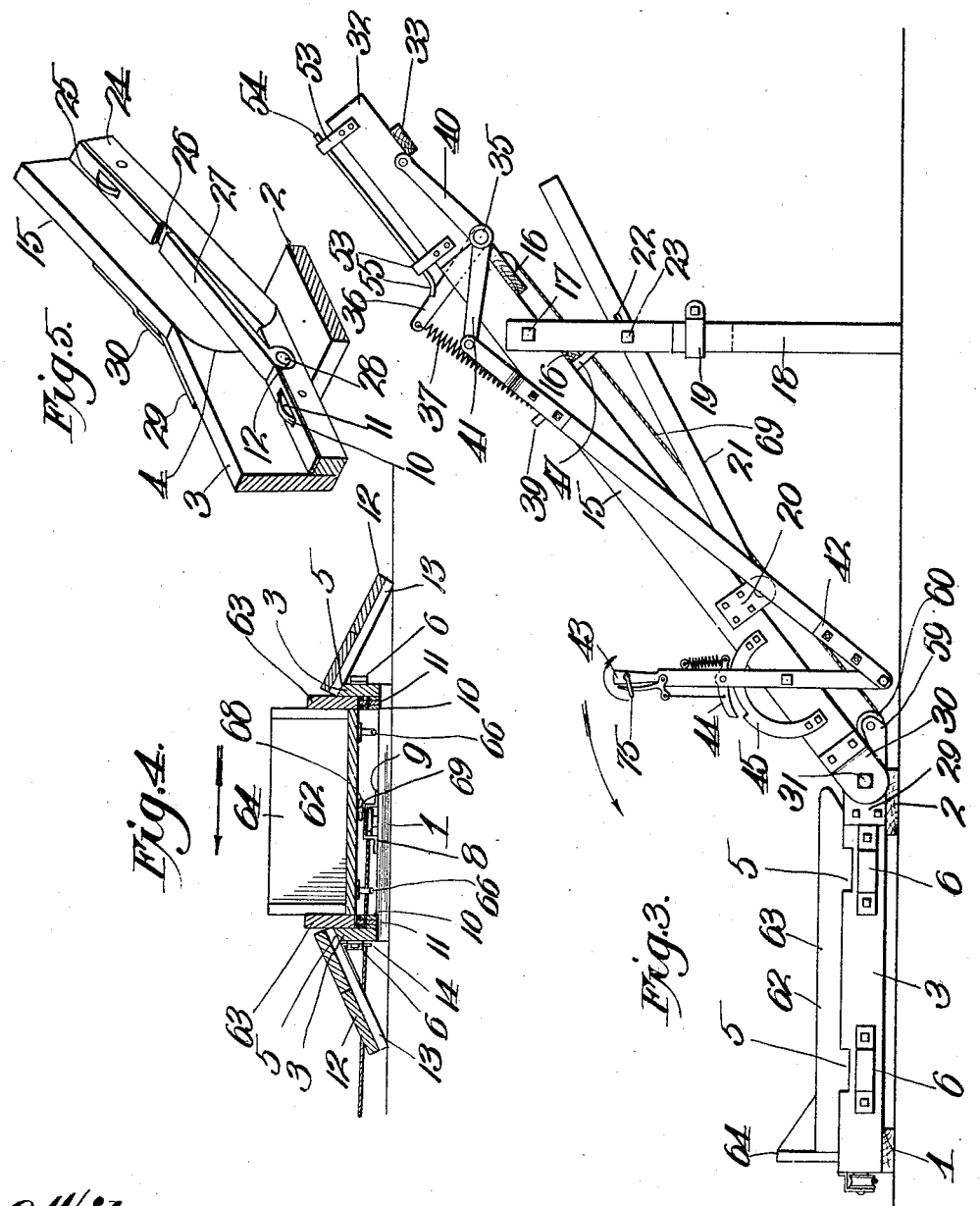
Witnesses
Frank R Glore
H. C. Rodgers
Inventor
J. C. Walter
By George H. Thorpe Atty

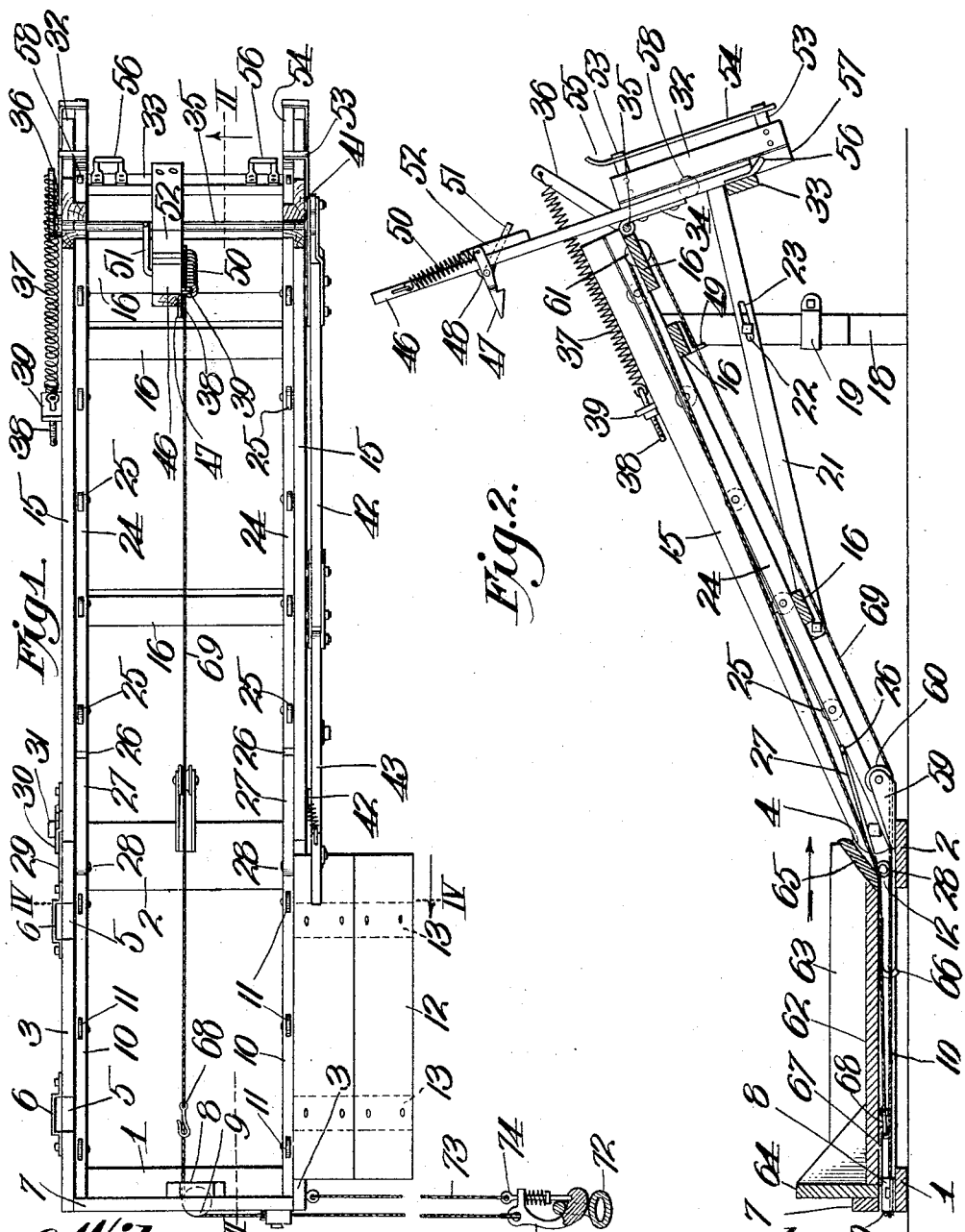

UNITED STATES PATENT OFFICE.

JOSEPH C. WALTER, OF LECOMPTON TOWNSHIP, DOUGLAS COUNTY, KANSAS.

ELEVATING AND DUMPING APPARATUS.

1,120,869. Specification of Letters Patent. Patented Dec. 15, 1914.

Application filed January 8, 1912, Serial No. 670,100. Renewed February 6, 1914. Serial No. 817,053.

*To all whom it may concern:*

Be it known that I, JOSEPH C. WALTER, a citizen of the United States, residing in Lecompton township, in the county of Douglas and State of Kansas, have invented certain new and useful Improvements in Elevating and Dumping Apparatus, of which the following is a specification.

This invention relates to elevating and dumping apparatus, and has for its object to produce an efficient and reliable means whereby loose material such as coal, earth, manure and the like, may be easily and cheaply raised and loaded into wagons or carts, the invention being designed more especially as an improvement in the loader on which Patent Number 987,198 was issued to me March 21, 1911.

With this general object in view and others as hereinafter appear, the invention consists in certain novel and peculiar features of construction and organization as hereinafter described and claimed; and in order that it may be fully understood reference is to be had to the accompanying drawing in which—

Figure 1, is a top plan view of an elevating and dumping apparatus embodying my invention, said figure showing the dumping apparatus in dumping position and with an inclined approach, omitted. Fig. 2, is a vertical section on the line II—II of Fig. 1. Fig. 3, is a side elevation of the apparatus with what may be termed the descending bridge omitted and with the other parts in their initial positions. Fig. 4, is a cross section on the line IV—IV of Fig. 1. Fig. 5, is a fragmentary perspective view on an enlarged scale to show clearly the connection between the base and elevating members of the apparatus.

In the said drawings the base member of the apparatus is constructed as follows: 1 and 2 indicate cross bars to rest upon the ground. 3 are parallel side bars upon and in rigid relation to the cross bars and provided at their front ends with segmental recesses 4, and in their upper edges with recesses 5, and secured to the outer sides of said bars 3 in the vertical planes of recesses 5 are keepers 6. 7 is a cross bar connecting the opposite ends of side bars 3 from the recessed ends thereof, and secured centrally in said cross bar is a holder 8, containing a horizontally-arranged sheave 9 which projects beyond the outer side of bar 7, for a purpose which hereinafter appears. 10 are stringers secured to the inner sides of the side bars 3, and provided at suitable points with anti-friction track rolls 11, which project slightly above the upper sides of the stringers 10, these stringers and rolls constituting a pair of trackways. 12 indicates a pair of bridges consisting of boards nailed or otherwise secured upon cross cleats 13. These bridges are arranged in inclined position with their lower ends resting upon the ground and their upper ends resting upon the side bars 3. The upper ends of the cleats fit in notches 5, and to guard against accidental dislodgment of the bridges they are provided with depending hooks 14 for engagement with the underlying keepers 6, it being obvious that the bridges can be readily placed in or removed from operative position.

The elevating member of the apparatus is constructed as follows: 15 indicates a pair of parallel side bars spaced apart to correspond to the side bars 3 and rounded at their lower end to fit in the recesses 4 in the ends of said bars 3, and said bars are connected by a plurality of suitably spaced underlying cross bars 16, one of which is adjacent to the front ends of said bars 15. Pivoted at 17 to the outer sides of bars 15 are extensible legs 18, each leg consisting of two members fitting slidingly together and secured at any desired point of extensibility by clamping sleeves 19. To brace the legs and side bars at different angles to each other, and also to act as a stop for the dumping element hereinafter described, the bars 15 are provided with plates 20 to which are pivoted bars 21, fitting against the inner sides of the legs and provided with longitudinal slots 22 engaged by clamping devices 23, the said devices being for the purpose of securing the legs in a substantially vertical position irrespective of the inclination of the bars 15. The bars 15 are provided at their inner sides with longitudinal stringers 24 equipped with suitably spaced anti-friction rolls 25 which project slightly above the said stringers and with the latter constitute a pair of trackways. Said stringers are recessed in their upper sides and lower ends at 26, to receive the free ends of a pair of bridge bars 27, pivoted at 28, in the recesses 12 of the stringers 10. To pivotally connect the lower ends of bars 15 to the front ends of bars 3, the latter are provided at their outer sides with forwardly projecting plates 29 and the former with rearwardly projecting plates 30 overlapping plates 29 and pivotally connected thereto by bolts 31.

The dumping member of the apparatus consists of a pair of short parallel bars 32, spaced apart to correspond with the spacing of bars 15, and one or more underlying cross bars 33, and said bars 32 are provided at their undersides with hinge straps 34 pivotally engaging a transverse hinge rod 35 carried by the bars 15 at the front edge of the topmost cross bar 16 thereof, the arrangement being such that when the dumping member is elevated it abuts at its rear end against the upper end of bars 15. When the dumping member is in dumping position it rests against the front end of the combined brace and stop bars 21. At one end rod 35 is equipped with a crank arm 36 connected by a retractile spring 37 to a bolt 38, adjustable in the plate 39 secured to the adjacent side bar 15, and at its opposite end the hinge rod is equipped with a crank arm 40 pivoted to the adjacent side bar of the dumping member and with a crank arm 41 pivotally connected by a link 42 with a hand lever 43 pivoted to one of the bars 15 of the elevating member, and said lever is provided with the customary latch mechanism 44 for engagement with a sector 45 secured to said last-named side bar.

Arranged centrally and longitudinally of the dumping member and secured to the cross bar 33 thereof, is a bar 46 adapted when the dumping member is elevated to rest upon the adjacent bars 16, of the elevating member, and provided with a depending catch 47 pivoted at 48, for engagement with a plate 49 extending downward from the rear edge of the intermediate cross bar 16, a spring 50 attached to the upper end of said catch and to a fixed point on bar 46, holding the catch in operative position. Projecting upwardly and forwardly from the pivot of the catch and at the opposite side of bar 46, is a trip arm 51, for a purpose which hereinafter appears, a block 52 being secured to the upper side of bar 46 to contact with the bottom of the dumping car hereinafter described, as the dumping action takes place, as otherwise the upper end of the catch and spring 50 would have to make such contact. Secured to each side bar of the dumping member is a pair of angle brackets 53, and secured to said angle brackets is a pair of guard rails 54 which are above and inward of the plane of bars 32 and flare upward at their inner ends at 55, for a purpose which hereinafter appears, and secured to and projecting upward from the cross bar 33 of the dumping member, is a pair of loops 56, for a purpose which hereinafter appears. Secured to and at the inner sides of the side bars 32 of the dumping member and in the same vertical plane as the guard rails 54, is a pair of stringers 57, and suitably journaled in and projecting slightly above said stringers are anti-friction rolls 58, which with the stringers constitute a pair of trackways. Secured to cross tie 2 of the base member is a bracket 59 equipped with a sheave 60, and in the same vertical plane as said sheave is a sheave 61, mounted in the front cross bar 16, of the elevating member.

62 is a drag receptacle adapted to rest upon the rollers 11 of the base member and receive the material to be loaded, fitting between the side walls 3 and against the rear wall 7 of said member. The receptacle has side walls 63, a rear wall 64 of greater height than the side walls, and an upwardly sloping front wall 65, and depending from the bottom is a pair of hooks 66 in the vertical plane of the loops 56 of the dumping member, the receptacle being also provided at its underside with a plate 67 with which is detachably engaged a hook 68 secured to one end of the cable 69 which passes around sheave 61. The lower strand of the cable also passes under the sheave 60 and through bracket 8 and around sheave 9, and is equipped at its end with a snap hook 71, for engagement by the clevis or equivalent device 72 of a scraper or equivalent means, not shown, for charging the drag receptacle with the material to be elevated and dumped.

73 is a cable connected at its opposite ends to the base member and to the spring actuated pin 74 of the snap hook, and the cables will be of such length that at the proper time the cable 73 will withdraw the spring actuated pin 74 and permit the clevis 72 to slip out of the snap hook.

In practice the loose material will preferably be gathered up by the scraper as hereinbefore suggested and the same will be drawn over the base member in the direction indicated by the arrow Fig. 4, the inclined bridges and the drag receptacle being sufficiently strong and rigid to sustain the weight of the draft animals who will walk up one bridge over the drag receptacle and down the other bridge. As the front end of the loaded scraper attains the upper end of the ascending bridge the operator dumps it so that the material shall fall into the drag receptacle, and continues across the base member and engages the clevis 72 of the scraper with the snap hook. He then proceeds in the same general direction, and the pull of the scraper on the snap hook, through the medium of the cable 69, moves the drag receptacle in the direction indicated by the adjacent arrow, Fig. 2, and in this connection it will be noted that in the initial part of such movement the front end of the drag receptacle is raised by and travels upon the hinged bridge bars 27 so that the hooks 66, shall be raised sufficiently to clear the cross bar 2. The bridge bars also serve to reduce the shock incident to the contact of the front end of the drag receptacle with the elevating member—as the angle of the said bridges is less than that of the elevating member. The continued pull of the scraper then carries the receptacle upward on the elevating member and finally upon the dumping member. Before the drag receptacle reaches the dumping member, it is disposed above the bar 46 and depresses trip arm 51 to trip the catch 47 from engagement with plate 49 against the resistance of spring 50. While continuing the upward movement and while holding said catch tripped, the front end of the drag receptacle enters the dumping member below the guard rails 54 and upon its roll-equipped stringers 57, and as the hooks 66 enter the loops 56, the major portion of the weight of the drag receptacle is upon the dumping member and the dumping action occurs, it being understood that just as the hooks are entering the loops 56, the cable 73 is placed under tension and as a result of the continued forward movement of the scraper and hence of the cable 69, the pin 74 is withdrawn and the clevis slips out of the snap hook. It will be seen that, due to the engagement of the hooks 66 with the loops 56, and the interposition of the drag receptacle between the trackways and the guard rails of the dumping member, it will be impossible as the dumping action occurs, for the drag receptacle to either slide forward or tip forward out of the dumping member. Assuming that the latch member of lever 43 is either dispensed with or held inoperative, for instance by the pivoted loop 75, carried by lever 43, it will be apparent that as the dumping action occurs, the lever 43 will swing in the direction indicated by the adjacent arrow Fig. 3, and the spring 37 will be tensioned as shown in Figs. 1 and 2, because the downward movement of the dumping member through the instrumentality of arm 40, rocks the hinge rod 35 and the other crank arms 36 and 41 attached thereto. To restore the parts to operative position the operator swings the lever back to its original position and in so doing through the link 42 and crank arm 41 with the assistance of spring 37, reëlevates the dumping member. As this occurs the weight of the drag receptacle will cause the same to slide downward from the dumping member over the elevating member and back to its original position on the base member. Should it be desired to prevent the dumping action as the loaded drag receptacle enters the dumping member, the operator can swing the loop 75 out of engagement with the handle of the latch mechanism and permit the latch to engage the sector 45 and thus lock the lever in rigid relation thereto.

It is obvious that with a machine of this character, any loose material may be handled, and that such material can be expeditiously loaded and elevated by means of scrapers and dumped into wagons or carts or into a freight car or the hold of a vessel, or it may be employed for filling trenches.

From the above description it will be apparent that I have produced a loading and unloading apparatus embodying the features of advantage enumerated as desirable, and I wish it to be understood that I reserve the right to make all changes properly falling within the spirit and scope of the appended claims.

I claim:

1. In a machine of the character described, the combination with a base member having a pair of trackways, of an elevating member extending upwardly from one end of the base member and provided with a pair of trackways, means for varying the inclination of the elevating member, and a pair of bridge bars bridging the joints between the trackways and hinged to the trackways of one member and resting loosely on the trackways of the other member.

2. In a machine of the character described, the combination with a base member having a pair of trackways, of an elevating member extending upwardly from one end of the base member and provided with a pair of trackways, extensible legs for varying the inclination of the elevating member and a pair of bridge bars extending at a lesser angle than the trackways of the elevating member and bridging the joints between said trackways and the trackways of the base member, each bridge bar being hinged to one of the members and resting at its free end on the adjacent trackway of the other member.

3. In an apparatus of the character described, the combination with a base member having a pair of trackways, an elevating member extending upwardly from one end of the base member and provided with a pair of trackways, extensible legs for varying the inclination of the elevating member and a pair of bridge bars extending at a lesser angle than the trackways of the elevating member and bridging the joint between said trackways, and the trackways of the base member, each bridge bar being hinged to one of the members and resting at its free end on the adjacent trackway of the other member, of a dumping member hinged to the upper end of the elevating member and provided with a pair of trackways, means to latch the dumping member in alinement with the elevating member, and a pair of bars pivoted to the elevating member and connected to the extensible legs to brace the same and projecting beyond said legs to form a stop for the dumping member in its dumping action.

4. In an apparatus of the character described, the combination with a base member having a pair of trackways, an elevating member extending upwardly from one end of the base member and provided with a pair of trackways, extensible legs for varying the inclination of the elevating member and a pair of bridge bars extending at a lesser angle than the trackways of the elevating member and bridging the joint between said trackways and the trackways of the base member, each bridge bar being hinged to one of the members and resting at its free end on the adjacent trackway of the other member, of a dumping member hinged to the upper end of the elevating member and provided with a pair of trackways, means to latch the dumping member in alinement with the elevating member, a pair of bars pivoted to the elevating member and connected to the extensible legs to brace the same and projecting beyond said legs to form a stop for the dumping member in its dumping action, a drag receptacle adapted to rest upon the trackways of the base member and to be moved upward upon the trackways of the elevating member and dumping member, and means whereby the drag shall trip said latch so that the dumping member shall swing downward as soon as the major portion of the weight of the said drag receptacle is imposed upon it.

5. In an apparatus of the character described, the combination of an elevating member, a dumping member hinged to the front end of the elevating member and provided with a part projecting rearwardly beyond the hinge point and resting on the elevating member when the dumping member is alined therewith, a latch mechanism for securing the dumping member in alinement with the elevating member, means whereby said latch mechanism may be tripped to permit the dumping member to swing downward, and a drag receptacle to move upward upon the elevating member and over the said rearwardly extending part of the dumping member and adapted while moving over the last-named part to trip said latch mechanism so that the dumping member will swing downward as soon as the major portion of the drag receptacle is imposed upon it.

6. In an apparatus of the character described, the combination of an elevating member, a dumping member hinged to the front end of the elevating member and provided with a part projecting rearwardly beyond the hinge point and resting on the elevating member when the dumping member is alined therewith, a latch mechanism for securing the dumping member in alinement with the elevating member, means whereby said latch mechanism may be tripped to permit the dumping member to swing downward, a drag receptacle to move upward upon the elevating member and over the said rearwardly extending part of the dumping member and adapted while moving over the last-named part to trip said latch mechanism so that the dumping member will swing downward as soon as the major portion of the drag receptacle is imposed upon it, and yielding means tending to resist the dumping action of the dumping member to assist in returning the latter to its original position.

7. In an apparatus of the character described, the combination of an elevating member, a dumping member hinged to the front end of the elevating member and provided with a part projecting rearwardly beyond the hinge point and resting on the elevating member when the dumping member is alined therewith, a latch mechanism for securing the dumping member in alinement with the elevating member, means whereby said latch mechanism may be tripped to permit the dumping member to swing downward, a drag receptacle to move upward upon the elevating member and over the said rearwardly extending part of the dumping member and adapted while moving over the last-named part to trip said latch mechanism so that the dumping member will swing downward as soon as the major portion of the drag receptacle is imposed upon it, yielding means tending to resist the dumping action of the dumping member to assist in returning the latter to its original position, and yielding means for effecting the automatic relatching of the dumping member to the elevating member after the former has attained its original or elevated position.

8. The combination of a base member, an elevating member and a dumping member, a latch mechanism securing the dumping member elevated and in alinement with the elevating member, yielding means tending to resist downward movement of the dumping member, one or more hooks projecting from the dumping member, guard rails carried by the dumping member, a drag receptacle adapted to be moved from the base member upward over the elevating member and onto the dumping member and below the guard rails thereof, and provided with one or more hooks to engage the loops of the dumping member to limit the movement of the said receptacle on the dumping member, means adapted to be actuated by the moving drag receptacle to unlatch the dumping member from the elevating member to permit the latter when the major portion of the weight of the drag receptacle is upon it to swing downward to dumping position, and means to reëlevate the dumping member to permit the drag receptacle to slide downward off the same and over the elevating member onto the base member.

9. The combination of a base member, an elevating member, and a dumping member, a latch mechanism securing the dumping member elevated and in alinement with the elevating member, yielding means tending to resist downward movement of the dumping member, one or more loops projecting from the dumping member, guard rails carried by the dumping member, a drag receptacle, a cable suitably guided and connected at one end to the drag receptacle and adapted when its free end is pulled to drag the drag receptacle from the base member upward upon the elevating member and onto the dumping member, means whereby the drag receptacle in such movement shall trip said latch mechanism to permit the dumping member to swing downward when the major portion of the weight of the drag receptacle is imposed upon it, and means to restore the dumping member to its original position after the dumping action has occurred to effect the restoration of the drag receptacle to its original position.

In testimony whereof I affix my signature, in the presence of two witnesses.

JOSEPH C. WALTER.

Witnesses:
P. G. DAVIDSON,
J. W. KREIDLER.

Copies of this patent may be obtained for five cents each, by addressing the "Commissioner of Patents, Washington, D. C."